United States Patent [19]
White

[11] Patent Number: 5,174,231
[45] Date of Patent: Dec. 29, 1992

[54] WATER-BARRIER OF WATER-SWELLABLE CLAY SANDWICHED BETWEEN INTERCONNECTED LAYERS OF FLEXIBLE FABRIC NEEDLED TOGETHER USING A LUBRICANT

[75] Inventor: Alec W. White, Hoffman Estates, Ill.

[73] Assignee: American Colloid Company, Arlington Heights, Ill.

[21] Appl. No.: 628,497

[22] Filed: Dec. 17, 1990

[51] Int. Cl.$^5$ ............... B32B 5/06; B32B 5/16; B32B 5/26; B32B 7/08; B32B 31/16
[52] U.S. Cl. ............... 112/420; 28/112; 112/441; 112/262.1; 210/679; 210/681; 210/688; 210/807; 210/502.1; 210/507; 210/911; 405/16; 405/38; 405/53; 405/270; 428/102; 428/192; 428/234; 428/235; 428/241; 428/243; 428/283; 428/300; 428/340; 428/913
[58] Field of Search ............... 28/112; 112/420, 441, 112/262.1; 210/502.1, 507; 428/102, 192, 234, 235, 241, 243, 283, 340, 913

[56] References Cited

U.S. PATENT DOCUMENTS

| | | | |
|---|---|---|---|
| 3,608,166 | 9/1971 | Gruget | 28/112 |
| 3,719,546 | 3/1973 | Parlin | 28/112 |
| 4,113,535 | 9/1978 | Lefkowitz et al. | 28/112 |
| 4,847,140 | 7/1989 | Jaskowski | 28/112 |

*Primary Examiner*—James C. Cannon
*Attorney, Agent, or Firm*—Marshall, O'Toole, Gerstein, Murray & Bicknell

[57] ABSTRACT

A multi-layer article of manufacture includes an intermediate layer of a water-swellable colloidal clay, such as bentonite, sandwiched between two layers of flexible sheet or fabric material wherein the two flexible layers of sheet or fabric material are structurally interconnected through the intermediate clay layer, such as by needle punching, after lubrication of the clay with a liquid, such as water, to interconnect fibers of one fabric layer to the other fabric layer at spaced locations over essentially the entire inner surface areas of both sheet or fabric material layers.

42 Claims, 2 Drawing Sheets

WATER-BARRIER OF WATER-SWELLABLE CLAY SANDWICHED BETWEEN INTERCONNECTED LAYERS OF FLEXIBLE FABRIC NEEDLED TOGETHER USING A LUBRICANT

FIELD OF THE INVENTION

The present invention is directed to a multi-layer article of manufacture useful as a waterproofing membrane for waterproofing surfaces such as soil, plaza decks, in the formation of waterproofed construction areas, soil structures, such as lagoons, hazardous or toxic waste containment areas, plaza decks, subterranean foundation surfaces and the like. More particularly, the present invention is directed to a multi-layer waterproofing article of manufacture including a layer of powdered or granular water-swellable clay, such as bentonite, surrounded by contacting layers of flexible fabric materials, such as geotextile fabrics, interconnected at spaced locations, after lubrication of the clay layer, such as by needle punching, to provide a structurally sound spacing and interconnection between the flexible fabric materials. The spacing between the fabric layers is defined by a thickness of an intermediate layer of powdered or granular water-swellable clay material. The fabric layers are water-permeable, if not initially, by virtue of their being punctured during the manufacture of the multi-layer article of manufacture but do not require an adhesive to structurally secure the water-swellable clay to the upper and lower fabric layers.

The method of manufacture includes interconnecting the upper and lower fabric layers, at least one of which is a non-woven fabric, the other being either a woven or non-woven fabric, by needle punching, to interconnect fibers of one fabric layer to the fibers of the other fabric layer, and optionally, while maintaining sufficient fabric porosity in at least one fabric layer, to permit the intermediate water-swellable clay layer to extrude from the interior of the article to an exterior surface of the article, thereby creating a sealing layer of water-swellable clay capable of sealing at overlaps and seams between adjacent articles. The multi-layer article of manufacture of the present invention can maintain a relatively heavy, uniform thickness of water-swellable clay between the fabric layers without the necessity of application of adhesive on the major inner surfaces of the fabric layers. Where desirable, water or an adhesive can be applied to the edges of the article to prevent the water-swellable clay form falling out of the edges of the article, or the edges may be needle punched or sewn together. In other embodiments, water-impermeable layers can be adhered to one or both exterior surfaces of the fabric, or placed between adjacent articles or at an overlap of adjacent articles during installation to provide additional or safety layers of impermeability.

BACKGROUND OF THE INVENTION AND PRIOR ART

Various polymers, swellable clays, and articles of manufacture have been applied to the surface of soil to provide a waterproofing layer to prevent the penetration of water and hazardous or toxic materials into the earth, and to provide lagoons, ponds and other water containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as bentonite, have been manufactured by adhesively securing the water-swellable clay to major interior surfaces of flexible sheet materials for application to the soil surface in abutting or overlapping relation of adjoining multi-layered articles. Examples of flexible sheet materials containing adhesively secured water-swellable clays are found in the following U.S. patents: Clem U.S. Pat. Nos. 4,467,015, 4,501,788; McGroarty et al U.S. Pat. No. 4,693,923; Harriett U.S. Pat. Nos. 4,656,062, 4,787,780.

U.K. published patent application GB 2,202,185A discloses a layer of water-swellable bentonite between flexible layers that have been needle punched together in a needle loom that secures material form a lower layer of non-woven textile material to an upper layer of non-woven textile material, and secures material from an upper non-woven textile material to the lower non-woven textile material.

Another waterproofing barrier, disclosed in Blias U.S. Pat. No. 4,344,722, is constructed in the field by applying a first flexible, water-permeable fabric layer, overlaying a thickness of water-swellable clay material and applying an overlayer of the same flexible, water-permeable fabric thereover. Other patents disclosing the use of water-impermeable layers for protecting a soil surface include British Patent Specification 1,059,363; British Patent Specification 1,029,513 and British Patent Specification 1,129,840.

German patent DE 30 04 503 C2 discloses an article having two fabric layers including one one-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments.

While the Blias waterproofing barrier does not require the use of adhesive because the multiple layers are assembled at their final location, this at-site assembly is disadvantageous because of the increased man hours necessary to construct the barrier at the site and because of the attendant difficulty in applying a uniform thickness of the water-swellable clay over the lower fabric layer with relatively crude construction equipment.

The above disadvantages of adhesively affixing the water-swellable clay to upper and lower fabric layers over their full internal, major surface areas or assembling a multi-layer article at the site of application are overcome in accordance with the principles of the present invention, as will be described in more detail hereinafter.

SUMMARY OF THE INVENTION

In brief, the present invention is directed to a multi-layer article of manufacture including an intermediate layer of a water-swellable colloidal clay, such as bentonite, sandwiched between two layers of flexible sheet or fabric material wherein the two flexible layers of sheet or fabric material are structurally interconnected to surround the intermediate clay layer, such as by needle punching, at spaced locations over essentially the entire surface areas of both sheet or fabric material layers. When the fabric layers are secured together by needle punching, in accordance with the preferred embodiment, at least one of the fabric layers should be a non-woven fabric. In accordance with an important feature of the present invention, the bentonite clay/needle interface, at least in the areas where the clay is penetrated by a needle during securement of the two fabric layers, is wetted with a lubricant, liquid or dry, preferably water or other aqueous lubricant, e.g., water, or aqueous solutions containing a lubricant, such as a glycol, to provide easier needle penetration (less friction) with less wear and/or needle breakage; quicker and more efficient manufacture; and a more compact, tighter product that has an unexpectedly more consistent, even thickness of clay over the entire fabric area covered with clay. Alternatively, the clay particles can be wetted throughout the thickness of the clay layer, or other abrasive material layer, such as by wetting the surface area of the clay particles while the clay particles are deposited on the lower fabric layer. Alternatively, only a portion of the clay particles need be wetted during deposition of the clay layer in an amount sufficient to lessen the friction of the needles during penetration of the clay layer. In accordance with one important embodiment of the present invention, the upper and lower fabric layers are interconnected by needle punching wherein a plurality of fibers or filaments or strands of material are dislodged from an upper non-woven fibrous layer, forcing the fibrous material through the intermediate water-swellable clay layer and into the lower fabric layer. The fibers, filaments or strands of material from the upper non-woven layer are interconnected to the lower layer requiring only one non-woven upper fabric layer and, optionally, fibers from a lower non-woven layer are needle-punched into the upper layer.

Accordingly, one aspect of the present invention is to provide a new and improved multi-layer articles of manufacture including upper and lower flexible sheet or fabric materials, at least one of which is non-woven, and an intermediate layer of a water-swellable clay or other abrasive material, wherein the upper and lower sheet or fabric layers are structurally interconnected by interconnecting fibers or filaments or strands of flexible material from one non-woven fabric layer to the other fabric layer while lubricating the abrasive material layer, or the abrasive material layer at least in an area in which the needles are in contact with or directly on or beneath the non-woven layer, and without requiring an adhesive contacting the major internal surfaces of the sheet or fabric layers to provide structural integrity.

Another aspect of the present invention is to provide a method of needle punching, sewing or quilting two flexible fabrics together, surrounding a uniform thickness of a water-swellable clay or other layer of powdered or granular, abrasive material by wetting at least a needle-penetrated surface of the clay or other abrasive material layer between the two fabric layers at the area in which the needles are in contact with the sewing or needle punch needles to reduce the coefficient of sliding friction of the abrasive material prior to needle penetration, thereby reducing needle breakage and vibration of the article during manufacture, while the abrasive particles are heavier due to water absorption, at least on the surface of the abrasive particle layer to substantially reduce movement of the clay layer during manufacture, thereby maintaining an even thickness of abrasive material between the fabric layers through completion of manufacture.

Another aspect of the present invention is to provide a new and improved, more compact multi-layer article of manufacture including an intermediate layer of water-swellable colloidal clay material sandwiched between contacting upper and lower layers of a water-permeable flexible sheet or fabric material, where the upper and lower sheet or fabric materials may be the same or different, at least one of which is a non-woven fabric.

Still another aspect of the present invention is to provide a new and improved waterproofing membrane capable of holding water disposed above the membrane such that water permeates the membrane at a rate of $1 \times 10^{-7}$ cm/sec or less, wherein the membrane includes a pair of flexible sheet or fabric layers surrounding an intermediate clay layer, wherein the fabric layers are structurally interconnected by neddle punching or needle looming, while lubricating the needle penetration into the intermediate clay layer such that the membrane can be manufactured as a completed multi-layer membrane in roll form with significantly less needle wear and/or breakage, while maintaining an even thickness of clay between the fabric layers.

A further aspect of the present invention is to provide a new and improved multilayer article of manufacture including a pair of flexible sheet material layers having a layer of powdered or granular abrasive material, such as a water swellable clay and/or a liquid interacting material therebetween, wherein the active material is selected from the group consisting of a water-swellable clay, an organophilic clay, a zeolite, a water-soluble contaminant absorbent, a water-soluble contaminant adsorbent, an ion-exchange material, a water-soluble contaminant reactant, a water-soluble contaminant neutralizing material, and mixtures thereof in separate or intermixed layers, by sewing, quilting or needle punching the two fabric layers together surrounding the abrasive material after first wetting a needle-penetrated particle surface area of the abrasive material.

The above and other aspects and advantages of the present invention will become apparent from the following detailed description of the present invention taken in conjunction with the drawings.

BRIEF DESCRIPTION OF THE DRAWINGS

FIG. 4 is a side view of a modified water barrier, including an upper layer of another water barrier material, being installed to a plaza deck; and .

DETAILED DESCRIPTION OF THE PREFERRED EMBODIMENT

Figure 1:
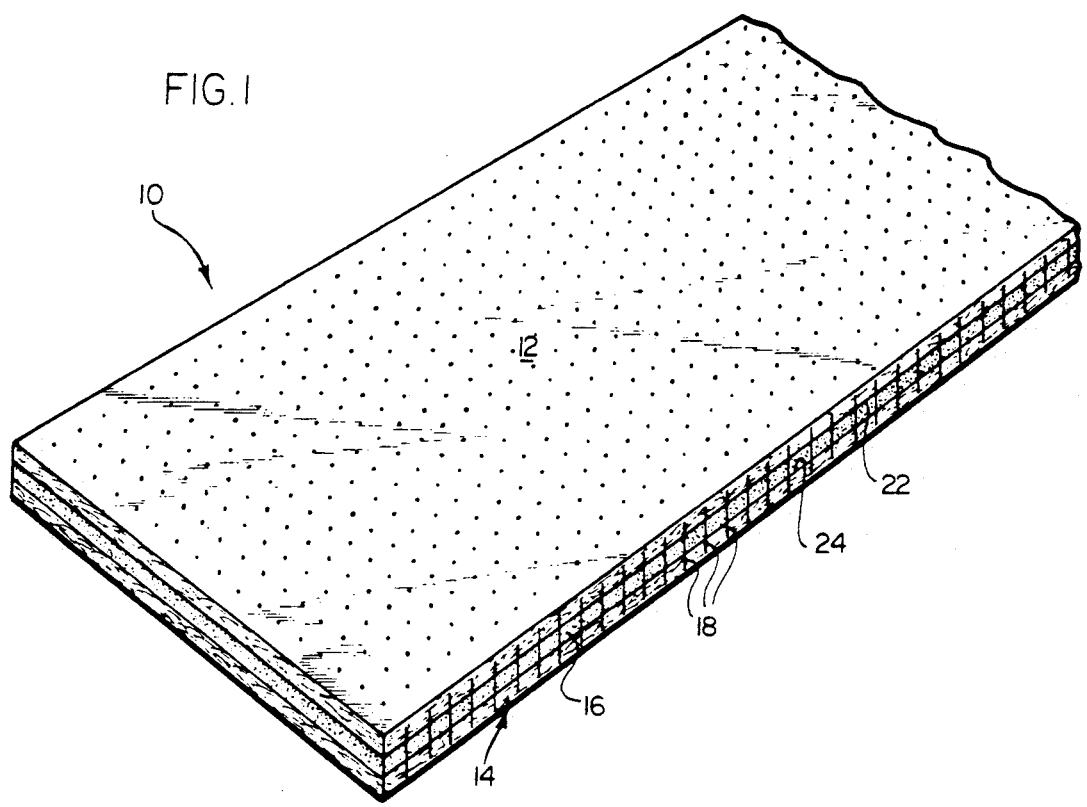
FIG. 1 is a partially broken-away perspective view of the multi-layer water barrier of the present invention.
Figure 2:
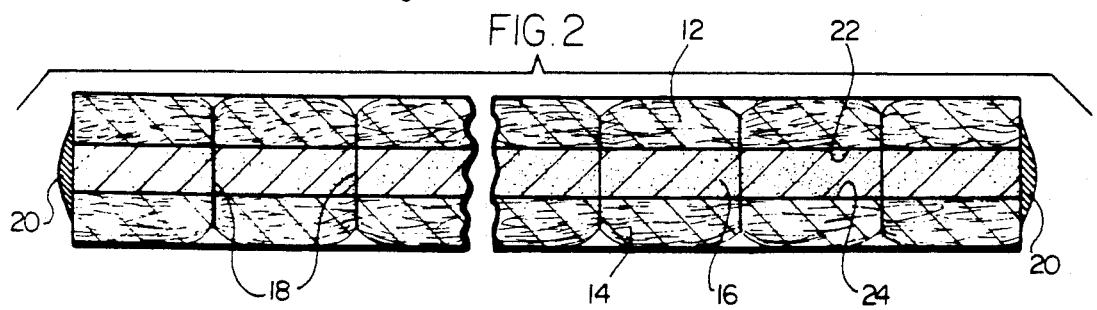
FIG. 2 is a partially broken-away perspective view of the multi-layer water barrier of the present invention, including water or an adhesive applied at the edges to prevent loss of water-swellable clay during handling and installation.

Turning now to the drawings, and initially to FIG. 1, there is illustrated a multi-layer article of manufacture, generally designated by reference numeral 10 useful as a waterproofing material including a pair of woven or non-woven flexible sheet material layers, generally designated 12 and 14, having a layer of waterswellable clay 16 sandwiched therebetween. The pair of sheet material layers 12 and 14 are structurally interconnected one to the other with fibers, filaments or strands of flexible material 18 from one fabric layer 12 or 14 interconnected to the other sheet material layer 12 or 14 at spaced locations over essentially the entire internal major surfaces 22 and 24 of the sheet material layers 12 and 14. Alternatively, the fabrics are secured together by sewing or quilting wherein at least a portion of the abrasive material, at least on one of the surfaces of the layer that is penetrated with the sewing or needle-punching needle has been wetted with water or other lubricant, preferably aqueous, to lubricate the needle penetration and thereby lessen article vibration during manufacture. As shown in FIG. 2, water or an adhesive can be applied along the edges of the multi-layer article of manufacture 10 to prevent some of the clay 16 from falling out of the edges of the multi-layer article of manufacture 10. As shown in FIG. 2, the adhesive 20 is applied between the flexible sheet material layers 12 and 14, at the edges only, to connect both flexible sheet material layers 12 and 14, to seal the edges and confine the clay 16 between the sheet material layers 12 and 14.

In accordance with an important and unexpected feature of the present invention, it has been found that the flexible sheet material layers 12 and 14 can be needle-punched, sewn or otherwise secured together surrounding a layer of clay or other abrasive powdered or granular material much more effectively, efficiently and maintaining a uniform thickness of abrasive material while experiencing substantially less needle wear and breakage by wetting the abrasive material prior to needle penetration. In accordance with a preferred embodiment, the fabrics are secured together structurally with threads, fibers, filaments or strands of flexible material from one non-woven fabric layer interconnected to the fibers of the other fabric layer at spaced intervals (e.g., 2 to 500 mil spacing) by applying water or other lubricating liquid to the surface of the layer of abrasive material, or to the surfaces of the abrasive particles during formation of the abrasive material layer, and thereby avoiding substantial needle wear and breakage while manufacturing a tighter, denser product with the opposed fabrics 12 and 14 held tighter together and surrounding a more uniform thickness of abrasive material as result of less vibration experienced by the product during manufacture.

Figure 4:
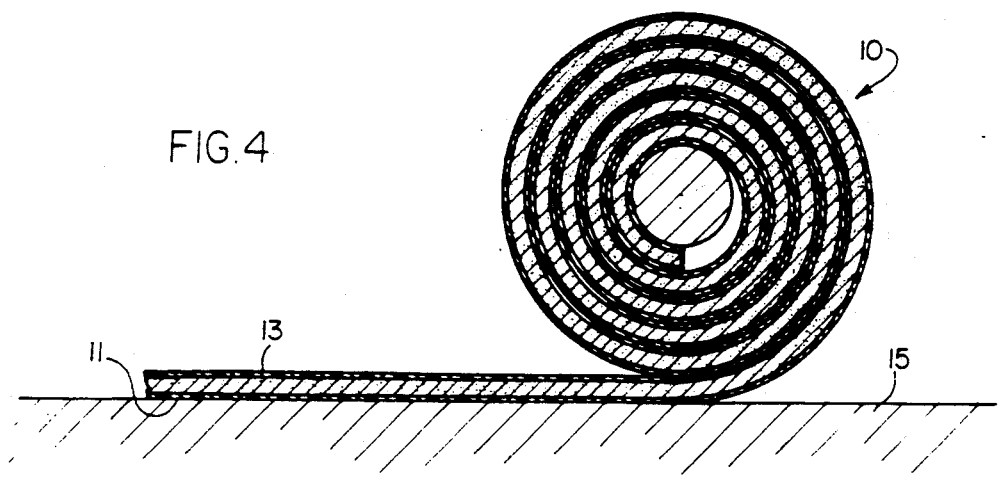

In accordance with another important feature of the present invention, the multi-layer article of manufacture, manufactured in accordance with the present invention, can be made with essentially no adhesive contacting the major internal surfaces 22 and 24 of flexible sheet material layers 12 and 14 so that the clay layer 16 sandwiched between the flexible sheet material layers 12 and 14 will maintain complete swellability while being an article of manufacture that is sufficiently structurally sound that it can be rolled up after manufacture, as shown in FIG. 4, without substantial loss of the intermediate clay layer 16.

Figure 3:
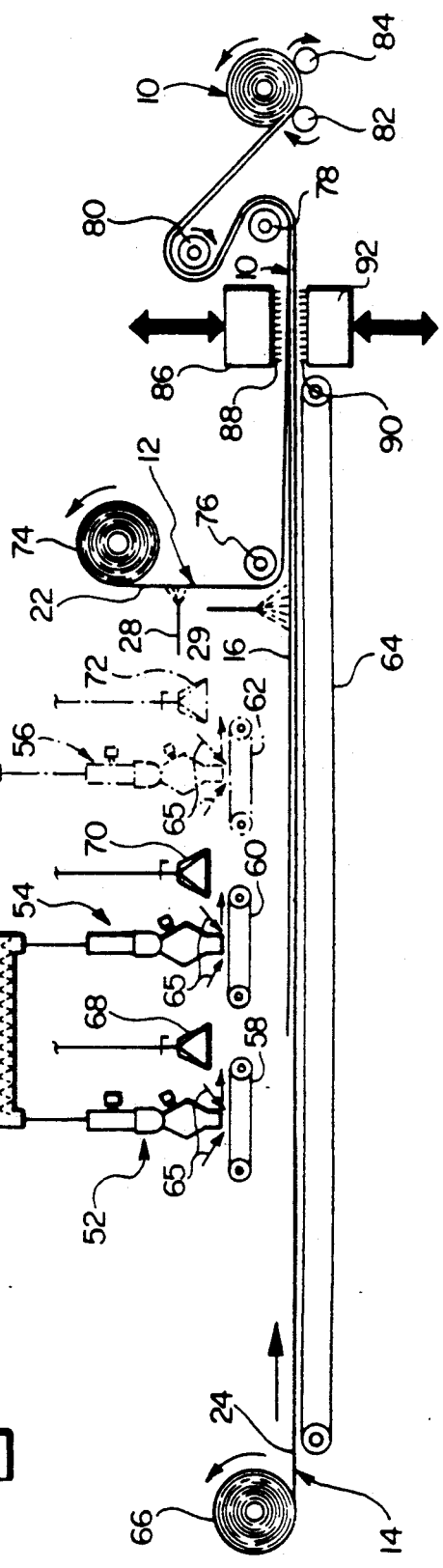
FIG. 3 is a schematic flow diagram of the manufacturing process for the water barrier of the present invention.

In accordance with another important and unexpected feature of the present invention, it has been found that when the flexible sheet material layers 12 and 14 are structurally interconnected with the threads, fibers, filaments or strands of flexible material 18 from one non-woven fabric layer interconnected to the fibrous material of the other fabric layer, and wet or dry lubricating the abrasive material, such as by pre-wetting the abrasive layer or individual particles prior to needle punching, as by spraying the abrasive layer surface via spray nozzles 28 or 29 disposed across the width of the abrasive material layer, or disposed to spray an under surface of non-woven fabric 22, as shown in FIG. 3. In this manner, the flexible sheet material layers 12 and 14, and the sandwiched or intermediate clay or other powdered or granular abrasive material layer 16 can be provided in a new and unexpectedly consistent thickness throughout the entire articles, while achieving structural integrity of an articles that has a reduced thickness with the same amount of abrasive material.

Turning now to FIG. 3, there is shown a schematic diagram of the method of manufacturing the multi-layered article of manufacture of the present invention, generally designated by reference numeral 30. A water-swellable colloidal clay, such as bentonite 16, is charged to a clay receiving hopper 32. An auger 34, disposed at a lower end of the receiving hopper 32 and in fluid communication therewith, forces the water-swellable clay through conduit 36 to an inlet 38 of a clay elevator 40. The water-swellable colloidal clay is discharged from the clay elevator 40 at clay elevator outlet opening 42 through conduit 44 into a clay-receiving hopper 46. A pair of augers 48 and 50 in fluid communication with the lower end of hopper 46 force the clay into one, two or three clay feeding mechanisms, generally designated by reference numerals 52, 54 and 56, for feeding the clay in a controlled manner to one, two or three continuous clay feed conveyor belts 58, 60 and 62 successively aligned above an elongated product conveyor belt 64. The clay generally is applied over a lower fabric layer 66 in an amount of about ¼ to about 10 pounds per square foot of fabric surface area, preferably about 1 to about 5 pounds per square foot.

Figure 5:
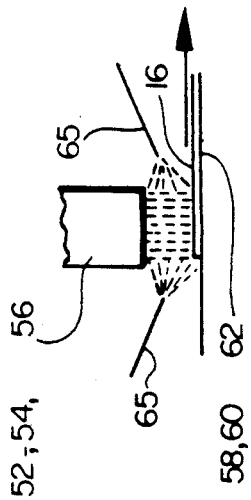
FIG. 5 is a side view showing one method of wetting individual abrasive particles as the particles are being deposited onto a lower fabric layer.

A supply of a flexible sheet material in roll form 66 is disposed above the continuous product conveyor belt 64 to provide a continuous supply of flexible sheet material onto an upper surface of the product conveyor belt 64 for receiving a layer of water-swellable clay from one, two or all three of the clay feed conveyor belts 58, 60 and 62. Any one, two or all three of the water-swellable clay feed conveyor belts 58, 60 and 62 can be used to provide one or more layers of water-swellable clay onto an upper surface 24 of the flexible sheet material held on top of the product conveyor belt 64, depending upon the thickness of clay desired in the product. As shown in FIG. 5, the individual abrasive, e.g. clay, particles can be wetted during deposition of the particles onto the lower fabric layer by spraying the particles, via spray nozzles 65, across the entire width of the fabric, as the particles drop from the clay feeders 52, 54 and/or 56. In this manner, the entire thickness or any portion of the abrasive layer thickness can be wetted during manufacture of the multi-layer article. Dust collection suction devices 68, 70 and 72 are disposed near each continuous clay feed conveyor belt 58, 60 and 62 to clear the air of fine clay particles emanating from clay feeding mechanisms 52, 54 and 56. A second roll of flexible sheet material 74 is disposed on a downstream side of the clay feeding mechanisms 52, 54 and 56 and above the product conveyor belt 64. The second roll of flexible sheet material 74 is fed by power driven roller 76, power rollers 78 and 80 and wind up rollers 82 and 84 to dispose flexible sheet material layer 12 on top of the clay layer 16 to sandwich the clay layer 16 between lower flexible sheet material layer 14 and upper flexible sheet material layer 12.

In accordance with an important feature of the present invention, needle punching device 86, as well known in the art as shown in U.K. published patent application G.B. 2,202,85A, and German patent DE 3,004,503, is disposed above and below the multi-layer article 10, at a point in the manufacturing process where the upper and lower flexible sheet material layers 12 and 14 have sandwiched the clay layer 16 therebetween, to interconnect the upper and lower sheet material layers 12 and 14 with flexible threads, fibers, filaments or strands of flexible material from one fabric layer to the other fabric layer, as shown by needles 88 on the upper portion of the needle-punching device 86, and needles 90 on the lower portion of the needle-punching device 92. Needles 88 dislodge fibers from the upper flexible sheet material layer 12 and force the dislodged fibers from sheet material layer 12 into lower sheet material layer 14 to interconnect these dislodged fibers from the upper sheet material layer 12 to the lower sheet material layer 14. Optionally, needles 90 on the lower portion of the needle punching device 86 dislodge fibers form the lower sheet material layer 14 and force the dislodged fibers upwardly through the clay layer 16 to interconnect the dislodged fibers from lower sheet material layer 14 to the upper sheet material layer 12, thereby interconnecting the upper and lower sheet material layers 12 and 14. If needles 90 are used, the lower fabric layer 14 should also be a non-woven fabric layer.

As shown in FIG. 4, the multi-layer article of manufacture can be secured on its outer surfaces to a lower layer 11 and/or an upper layer 13 of another water-barrier material, such as a polyolefin e.g. polyethylene or polypropylene sheet material, or the polybutene or polypropene compositions disclosed in this assignee's U.S. Pat. Nos. 4,534,925; 4,534,926 and 4,668,724, hereby incorporated by reference. The composite article of FIG. 4 is particularly suitable for securing to a plaza deck 15, or other concrete, planar surfaces, and provides new and unexpected waterproofing.

The water-swellable colloidal clay utilized as the sandwiched clay layer 16 between flexible sheet material layers 12 and 14 of the multi-layered articles of the present invention is any water-swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. To achieve the full advantage of the present invention, the colloidal clay, i.e., bentonite, generally is finely divided as known for use in water barrier panels and the like, i.e., 4 to 350 mesh, preferably about 10 to about 50 mesh.

In accordance with another important embodiment of the present invention, in addition to the water barrier characteristics of the multi-layer articles of manufacture of the present invention, the articles may be manufactured to include instead, or in addition to the water-swellable clay, a material capable of removing or interacting with one or more water-soluble contaminants from the water penetrating the outer fabric layer.

Some of the most prevalent contaminants found in waste waters contained in ponds, lagoons, areas of subteranean structure and other water-releasing areas, particularly where these areas include industrial waste waters, are heavy metal ions and water-soluble organic materials. It is well known in the prior art that natural and synthetic zeolites are capable of removing a substantial portion of the heavy metal ions from a waste water solution and that organophilic clays are capable of removing water-soluble organic materials from solution. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. In accordance with an important feature of the present invention, it has been found that by including a layer of a natural or synthetic zeolite or by including a layer of an organophilic clay with or without a layer of a water-swellable clay, such as bentonite, and/or applying a layer of the mixture of water-swellable clay with the zeolite or organophilic clay in the articles of manufacture of the present invention, the water-swellable clay will expand upon hydration and the zeolite and/or organophilic clay combined with the water-swellable clay will form a water-treatment layer wherein the zeolite and/or organophilic clay will last many times longer than it would if the entire waste water supply were treated as in the prior art with full contact of the entire volume of the waste water stream since only that quantity of water will be treated that permeates the water-swellable clay.

In accordance with another important embodiment of the present invention, the contaminant interacting layer, comprising any contaminant adsorbent, absorbent, reactant, or contaminant neutralizing material can be supplied as a separate layer below or instead of the water-swellable clay layer so that the amount of material treated for the removal of contaminants is only that material which completely penetrates the water-swellable clay layer as shown in FIG. 2.

In accordance with another important feature of the present invention, the contaminant removal material mixed with the water-swellable clay, as shown in FIG. 1, or supplied as a separate layer, as shown in FIG. 2, or included in the article of manufacture instead of the clay layer, can be any material capable of adsorbing, absorbing, reacting with for insolubilization or for neutralization, while keeping the contaminant water-soluble in order to substantially lessen or remove the contaminant characteristics of the contaminants originally present in the water contacting the article of manufacture. Examples of materials capable of removing or neutralizing contaminants that are present in water include absorbent fibers, such as microcrystalline cellulose; attapulgite clay; zinc rincinoleate absorbed on an absorbent fiber or other absorbent material; amorphous silica powder; synthetic calcium silicate; polyolesin pulp; sodium alumino-silicate (type A sodium zeolite); multodextran; sodium silica aluminates (note that all the above are absorbents). Other materials, such as adsorbents include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are natural or synthetic zeolites and/or an organophilic clay which is basically a montmorillonite clay that has been reacted with a quaternary organic material to make it hydrophilic and absorbent to organic contaminants.

The flexible sheet materials 12 and 14 are, for example, geotextile fabrics, at least one of which is a non-woven fabric. Any suitable fabrics can be used for this purpose, particularly since the fabrics have no water-impermeability purpose other than to achieve proper installation of clay layer 16 with a predetermined degree of clay bleed-through after installation. Suitable fabrics include woven and non-woven permeable and non-permeable fabrics made from polypropylene, polyesters, nylon, propylene-ethylene copolymers, polypropylene-polyamide copolymers, and the like. The geotextile fabrics are preferred for their bacteriological and chemical resistance but the fabrics can be biodegradable since, once positioned, the fabrics have little importance except as a means to install a clay layer in the proper position. In some installations, the thickness of the fabric is not important and such fabrics generally are available in thicknesses of about 3 to about 30 mils, or about one to about 50 ounces of material per square yard.

It has been found that by lubricating the water-swellable clay (bentonite) layer directly beneath a non-woven fabric layer prior to needle punching the article together, using approximately 2 ounces of water per square foot of bentonite clay surface area, with a bentonite layer of about 18 ounces of clay per square foot having a clay thickness of about ¼ inch, the following advantages were realized in comparison to the manufacture of the same product without water lubrication:

| Needle Wear & Breakage | Lubricated Clay Surface | Non-Lubricated Clay Surface |
| --- | --- | --- |
| % Needles Replaced | 33% | 100% |
| Frequency Replaced: Linear feet manufactured prior to replacement | 7000 | 2500 |
| Production Line Speed | X + 35% | X |
| Consistent Thickness (Statistical Variability) | Y − 35% | Y |
| Overall Thickness of Mat (estimate) | Z − 5% | Z |

The lubrication of the clay resulted in a faster and easier needle penetration and resulted in much less vibration being experienced by the multi-layer articles of the present invention during manufacture. Vibration tends to cause an even layer of powdered or granular material to shift position and accumulate in localized areas on the lower fabric material during manufacture, particularly during needle punching, and by lubricating the needle penetration in accordance with the present invention, the vibration experienced during manufacture was substantially lessened, and the clay surface was heavier resulting in a product with a consistent, uniform layer of clay, or other abrasive material, having a constant thickness. Further, needle lubrication enables faster production due to the ease of needle penetration, and enables the production of multi-layer articles having a reduced thickness (a denser product) since the upper and lower fabrics can be sewn or needle punched together more tightly. The application of lubricating water enabled production of needle punched articles containing bentonite clay to rise from about 120,000 ft.$^2$ per week to about 200,000 ft.$^2$ per week, hence, increased production line speed and decreased down time caused by needle replacements (maintenance).

The amount of lubricant, e.g. water, should be at least about 0.1% based on the dry weight of the intermediate layer of abrasive material, e.g. bentonite clay, and should be less than the amount which would necessitate an additional drying step, e.g. less than about 40% based on the dry weight of the intermediate layer of abrasive material. The preferred amount of lubricant is about 40% based on the dry weight of the intermediate layer of abrasive material. The preferred amount of lubricant is about 5% to about 25% based upon the dry weight of the clay or other abrasive material being lubricated. Any method of wetting the clay can be used in accordance with the principles of the present invention. Best results are obtained by spraying the bentonite clay or other abrasive material with about 10% to about 20% water, based on the dry weight of the clay, especially about 10% to about 15% by weight water, based on the dry abrasive material weight, to avoid excessive weight in the finished product.

It should be understood that the present disclosure has been made only by way of preferred embodiment and that numerous changes in details or construction, combination and arrangement of parts can be resorted to without departing from the spirit and scope of the invention as hereunder claimed.

What is claimed is:

1. A multi-layer article of manufacture useful as a waterproofing material comprising a pair of flexible sheet material layers having a layer of powdered or granular abrasive material sandwiched therebetween, said pair of sheet material layers having been structurally interconnected one to the other by sewing or needle punching to interconnect fibers from one flexible sheet material layer to the other flexible sheet material layer, thereby containing the abrasive material therebetween after first wetting the abrasive material for lubrication.

2. The article of claim 1 wherein the pair of flexible sheet material layers are interconnected with fibers, filaments or strands of flexible material secured to both sheet materials at spaced locations over essentially the entire internal surface areas of said other sheet material layers to structurally secure the intermediate abrasive material layer between the flexible sheet materials.

3. The article of claim 2 including dislodging fibers from the upper sheet material layer and securing the dislodged fibers to the other layer of sheet material to interconnect the upper and lower sheet material layers, and wherein the abrasive material is a water-swellable clay.

4. The article of claim 3 further including binding the edges of the article to prevent a substantial amount of clay from falling out of the edges of the article.

5. The article of claim 1 wherein one of the upper and lower sheet material layers is a non-woven fabric layer.

6. The article of claim 3 wherein the surface of the clay directly beneath one of the sheet material layers has been wetted with water in an amount of at least about 0.1 ounce of water per square foot of surface area prior to needle punching.

7. The article of claim 1 wherein the upper and lower sheet material layers have a weight of about one to about 50 ounces of material per square yard.

8. The article of claim 1 further including a layer of flexible water-impermeable material substantially coextensive with and adhered to one of the sheet material layers.

9. The article of claim 8 wherein the layer of water-impermeable material is a polymeric sheet material adhesively secured to the upper flexible sheet material layer.

10. The article of claim 8 wherein the layer of water-impermeable material is a mixture of a water-swellable clay and polypropene or polybutene as a cohesive, sticky layer.

11. A multi-layer article of manufacture comprising a pair of flexible sheet material layers having a contaminant interacting layer of material sandwiched therebetween, said contaminant-interacting layer being capable of interacting with water-soluble contaminants from water contacting said layer, said pair of fabric layers having been structurally interconnected one to the other with continuous, elongated fibers to confine the contaminant-interacting layer therebetween, after wetting at least one of the surfaces of the layer of contaminant-interacting material.

12. The article of claim 11 wherein the pair of flexible sheet material layers are interconnected with fibers, filaments or strands of flexible material secured to both sheet materials at spaced locations over essentially the entire surface areas of both sheet materials to structurally secure the intermediate contaminant-interacting layer between the flexible sheet materials.

13. The article of claim 11 wherein the contaminant interacting layer is selected form the group consisting of a contaminant adsorbent, contaminant absorbent, contaminant reactant, contaminant ion-exchange and contaminant neutralizing material.

14. The article of claim 13 wherein the contaminant-interacting material is selected from the group consisting of a zeolite, an organophilic clay, and mixtures.

15. The article of claim 14 wherein the contaminant-interacting material is an ion-exchanging material.

16. The article of claim 11 wherein the article further includes a water-swellable clay between said sheet material layers.

17. The article of claim 16 wherein said water-swellable clay is admixed with said contaminant interacting material.

18. The article of claim 16 wherein said water-swellable clay is provided as a seperate layer disposed on a down-stream side of the contaminant-interacting material.

19. A method of manufacturing a multi-layer water barrier including a lower layer of fabric, an upper layer of fabric and an intermediate layer of a powdered or granular abrasive material secured between the fabric layers by needle punching or sewing, the improvement comprising applying a lubricating-effective amount of a lubricant to the abrasive material to lubricate the penetration of a needle through the layer of abrasive material, while interconnecting fibers from one flexible sheet material layer to the other flexible sheet material layer, thereby reducing needle wear and friction and needle breakage and providing consistent, effective securing of the upper and lower fabric layers surrounding a uniform thickness of abrasive material.

20. In the method of claim 19 wherein the lubricant is a liquid comprising water and the liquid is applied to the needles or to the clay particles where the clay particles are in contact with said needles.

21. In the method of claim 20, wherein the water is applied over substantially an entire surface area of the clay layer on the clay surface first contacted with the needles, at a rate of at least about 0.1% by weight based on the dry weight of the clay.

22. In the method of claim 21 wherein the water is applied at a rate of about 0.1% to about 40% based on the dry weight of the intermediate clay layer.

23. The method of claim 19 wherein at least one of the sheet material layers is a non-woven fabric.

24. A method of preventing water from contacting a structure comprising installing a multi-layer article of manufacture against said structure, said multi-layer article including first and second sheet material layers having a layer of water-swellable clay therebetween, said first and second sheet material layers having been secured together on opposite sides of the clay layer by needle punching or sewing to interconnect fibers from one flexible sheet material layer to the other flexible sheet material layer, thereby confining the clay therebetween after contacting the clay with a lubrication-effective amount of liquid.

25. The method of claim 24 wherein at least one of the first and second sheet material layers is a non-woven fabric.

26. A multi-layer article of manufacture useful as a waterproofing material comprising a pair of flexible sheet material layers having a layer of powdered or granular clay sandwiched therebetween, said pair of sheet material layers consisting essentially of fibers selected from the group consisting of polypropylene, polyester, nylon, propylene-ethylene copolymers, polypropylene-polyamide copolymers, and combinations thereof, said sheet material layers having been structurally interconnected one to the other by sewing or needle punching to interconnect fibers from one flexible sheet material layer to the other flexible sheet material layer, to confine the clay therebetween after first wetting the clay surface directly beneath one of the sheet material layers for lubrication.

27. The article of claim 26 wherein the pair of flexible sheet material layers are interconnected with fibers, filaments or strands of flexible material secured to both sheet materials at spaced locations over essentially the entire internal surface areas of said other sheet material layers to structurally secure the intermediate clay layer between the flexible sheet materials.

28. The article of claim 27 wherein fibers dislodged from the upper sheet material layer are secured to the other layer of sheet material to interconnect the upper and lower sheet material layers.

29. The article of claim 26 further including edge binding to prevent a substantial amount of clay from falling out of the edges of the article.

30. The article of claim 26 wherein one of the upper and lower sheet material layers is a non-woven fabric layer.

31. The article of claim 28 wherein the clay had been wetted with water in an amount of at least about 0.1 ounce of water per square foot of surface area prior to needle punching.

32. The article of claim 26 further including a layer of flexible water-impermeable material substantially coextensive with and adhered to one of the sheet material layers.

33. The article of claim 32 wherein the layer of water-impermeable material is a polymeric sheet material adhesively secured to the upper flexible sheet material layer.

34. A multi-layer article of manufacture comprising a pair of flexible sheet material layers having a water-swellable clay layer sandwiched therebetween, said pair of fabric layers consisting essentially of fibers selected from the group consisting of polypropylene, polyester, nylon, propylene-ethylene copolymers, polypropylene-polyamide copolymers, and combinations thereof, said sheet material layers having been structurally interconnected one to the other with continuous, elongated fibers to confine the clay layer therebetween, after wetting at least one of the surfaces of the clay layer.

35. The article of claim 34 wherein the pair of flexible sheet material layers are interconnected with fibers, filaments or strands of flexible material secured to both sheet materials at spaced locations over essentially the entire surface areas of both sheet materials to structurally secure the intermediate clay layer between the flexible sheet materials.

36. A method of manufacturing a multi-layer water barrier including a lower layer of fabric, and an upper layer of fabric wherein said fabrics consisting essentially of fibers selected from the group consisting of polypropylene, polyester, nylon, propylene-ethylene copolymers, polypropylene-polyamide copolymers, and combinations thereof, and an intermediate layer of a powdered or granular abrasive material secured between the fabric layers by needle punching or sewing, the improvement comprising applying a lubricating-effective amount of a lubricant to the abrasive material to lubricate the penetration of a needle through the layer of abrasive material, to interconnect fibers from one flexible sheet material layer to the other flexible sheet material layer, thereby reducing needle wear and friction and needle breakage and providing consistent, effective securing of the upper and lower fabric layers surrounding a uniform thickness of said abrasive material.

37. In the method of claim 36 wherein the abrasive material is clay and the lubricant is a liquid comprising water and the liquid is applied to the needles or to the clay particles where the clay particles are in contact with said needles.

38. In the method of claim 37 wherein the water is applied over substantially an entire surface area of the clay layer on the clay surface first contacted with the needles, at a rate of at least about 0.1% by weight based on the dry weight of the clay.

39. In the method of claim 38 wherein the water is applied at a rate of about 0.1% to about 40% based on the dry weight of the intermediate clay layer.

40. The method of claim 36 wherein at least one of the sheet material layers is a non-woven fabric.

41. A method of preventing water from contacting a structure comprising installing a multi-layer article of manufacture against said structure, said multi-layer article including first and second sheet material layers having a layer of water-swellable clay therebetween, said first and second sheet material layers having been secured together on opposite sides of the clay layer by needle punching or sewing to interconnect fibers from one flexible sheet material layer to the other flexible sheet material layer, thereby confining the clay therebetween after contacting the clay with a lubrication-effective amount of liquid.

42. The method of claim 41 wherein at least one of the first and second sheet material layers is a non-woven fabric.

* * * * *